United States Patent [19]

Szabo et al.

[11] 3,719,755
[45] March 6, 1973

[54] O-ALKYL-S-PHTHALIMIDOMETHYL ALKYLDI-THIOPHOSPHONATES AS INSECTICIDES AND MITICIDES

[75] Inventors: Karoly Szabo, Syracuse, N.Y.; John Gary Brady, Kalamazoo, Mich.

[73] Assignee: Stauffer Chemical Company, New York, N.Y.

[22] Filed: March 12, 1969

[21] Appl. No.: 813,397

Related U.S. Application Data

[60] Division of Ser. No. 585,247, Oct. 10, 1966, Pat. No. 3,457,283, which is a continuation-in-part of Ser. No. 442,792, March 25, 1965, abandoned, which is a continuation-in-part of Ser. No. 265,072, March 14, 1963, abandoned, which is a continuation-in-part of Ser. Nos. 121,836, July 5, 1961, abandoned, and Ser. No. 217,302, Aug. 16, 1962, abandoned.

[52] U.S. Cl. .................................................. 424/200
[51] Int. Cl. ................................................. A01n 9/36
[58] Field of Search ...................................... 424/200

[56] References Cited

UNITED STATES PATENTS

| | | | |
|---|---|---|---|
| 3,355,353 | 11/1967 | Jamison | 424/200 |
| 3,457,283 | 7/1969 | Szabo et al. | 260/326 E |

*Primary Examiner*—Stanley J. Friedman
*Assistant Examiner*—Vincent D. Turner
*Attorney*—Wayne C. Jaeschke and Edwin H. Baker

[57] ABSTRACT

O-alkyl-S-phthalimidomethyl alkyl dithiophosphonates effective as pesticides in controlling a variety of pest organisms, for example, mites and insects.

14 Claims, No Drawings

O-ALKYL-S-PHTHALIMIDOMETHYL ALKYLDITHIOPHOSPHONATES AS INSECTICIDES AND MITICIDES

This application is a division of copending application Ser. No. 585,247 filed Oct. 10, 1966, now U.S. Pat. No. 3,457,283, which in turn was a continuation-in-part of Ser. No. 442,792 filed Mar. 25, 1965 now abandoned, which is a continuation-in-part application of Ser. No. 265,072 filed Mar. 14, 1963, now abandoned, which was a continuation-in-part application of Ser. No. 121,836 filed July 5, 1961 and Ser. No. 217,302 filed Aug. 16, 1962, now both abandoned.

This invention relates to alkylthiophosphonic acid esters and in particular to O-alkyl-S-phthalimidomethyl alkyldithiophosphonates. The invention is also concerned with the preparation and utility of said organophosphorus compounds as pesticides.

The compounds comprising the instant class of compounds are organophosphorus esters corresponding to the general formula

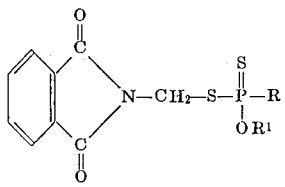

wherein R and R' are selected from the group consisting of lower alkyl and chloro lower alkyl of from one to four carbon atoms, inclusive.

In general the new compounds of this invention are prepared by the condensation of a metal salt of a lower O-alkyl hydrogen alkyldithiophosphonate and an N-halomethylphthalimide. The reaction proceeds readily in the liquid phase. Therefore, excellent results may be obtained by carrying out the reaction in the presence of a normally liquid organic solvent. Lower saturated alcohols and ketones have been found particularly useful. An organic solvent facilitates processing as well as agitation of the reactants. Temperatures that permit operation in the liquid phase and which are between room temperature and the reflux temperature of the solvent, if any is employed, are operable. Preferably the condensation reaction is carried out at reflux temperature usually at an elevated temperature.

It has been found that the compounds of the present invention are particularly effective as pesticides. They are effective in the control of insects and acarids.

The preparation of the compounds of the present invention may be carried out in accordance with the following non-limiting examples.

EXAMPLE 1

O-Ethyl-S-(phthalimidomethyl)-ethylphosphonodithioate

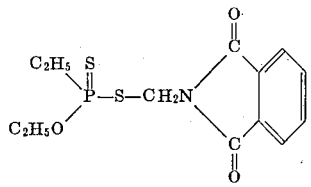

N-bromomethyl phthalimide (21.8 g.) was suspended in benzene (100 ml.) and to this mixture was added an equivalent amount (15.0 g.) of O-ethyl ethylphosphonodithioic acid. While the mixture was being stirred, triethylamine (9.2 g.) was added dropwise. This resulted in an immediate and spontaneous reaction with concomitant precipitation of triethyl hydrobromide. The temperature rose to 53°C. during the addition, after which the mixture was refluxed for 1 hour. The hydrobromide, obtained in quantitative amount, was separated by filtration. The filtrate was washed with water, 3% NaOH solution, then water again and dried over anhydrous MgSO4. After removing the solvent, 19.5 g. of a straw colored oil was obtained which had an $N_D^{22}$ of 1.6032. The product is obtained as a white solid, when recrystallized from EtOH. M.p. 56°C.

Using the same procedure of Example 1, but different phosphonodithioic acids, the following additional members of this group have been prepared.

EXAMPLE 2

O-Methyl-S-(phthalimidomethyl)-ethylphosphonodithioate

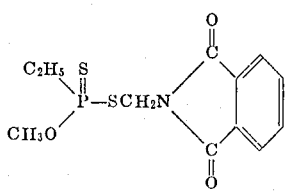

Prepared in a yield of 90%. Off-white solid, m.p. 73°C., after recrystallization from MeOH 87°C.

EXAMPLE 3

O-Ethyl-S-(phthalimidomethyl)-butylphosphonodithioate

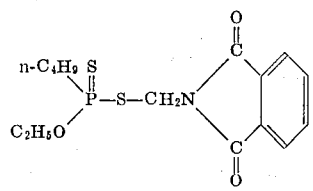

Viscous yellow oil, $N_D^{25} = 1.5850$

EXAMPLE 4

O-Isopropyl-S-(phthalimidomethyl)-ethylphosphonodithioate

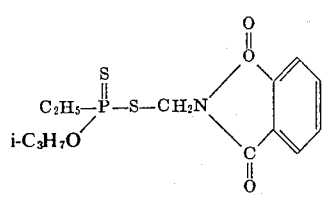

Yellow liquid, $N_D^{25} = 1.5852$

EXAMPLE 5

O-Isobutyl-S-(phthalimidomethyl)-ethylphosphonodithioate

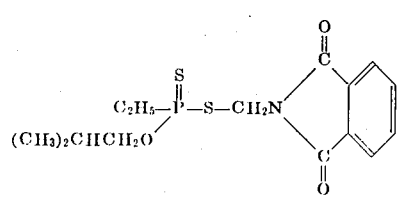

Off-white solid, m.p. 63°C.

EXAMPLE 6

O-Methyl-S-(phthalimidomethyl)-chloromethylphosphonodithioate

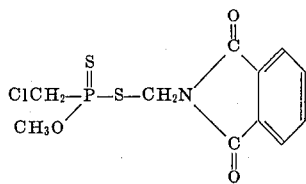

Amber, viscous oil.

EXAMPLE 7

O-Methyl-S-(phthalimidomethyl)-methylphosphonodithioate

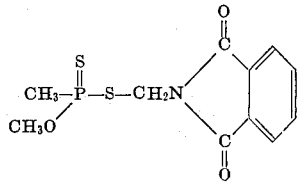

White solid, m.p. 89°C.

EXAMPLE 8

O-Propyl-S-(phthalimidomethyl)-ethylphosphonodithioate

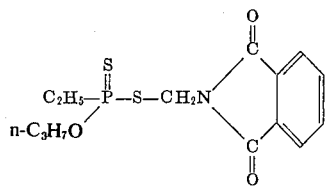

Yellow liquid, $N_D^{22} = 1.5921$

EXAMPLE 9

O-Isobutyl-S-(phthalimidomethyl)-methylphosphonodithioate

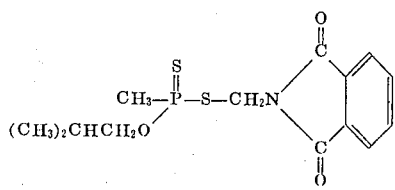

White solid, m.p. 49°C.

EXAMPLE 10

O-Ethyl-S-(phthalimidomethyl)-chloromethylphosphonodithioate

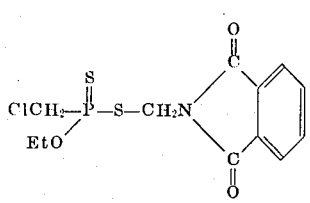

Nearly colorless, viscous oil, $N_D^{25} = 1.6070$.

As previously mentioned, the herein described alkyldithiophosphonates are useful as pesticides and have been found effective in controlling a variety of pest organisms falling within the lower orders of classification such as mites, insects and the like. For example, the compound of Example 5 was especially effective in controlling the two spotted mite, *Tetranychus telarius* (Linn.). In the test young pinto bean plants in the primary leaf stage were used as host plants. The young pinto bean plants were infested with several hundred mites. Dispersions of the candidate materials were prepared by dissolving them in a suitable solvent, usually acetone. Aliquots of the toxicant solutions were suspended in water with an emulsifying agent. Test suspensions were sprayed on the infested pinto bean plants. The effect of the candidate compounds was determined by comparison to control plants which had not been sprayed.

In practice the compounds are usually formulated with an inert adjuvant, utilizing methods well-known to those skilled in the art, thereby making them suitable for application. They may be used in the form of emulsions, non-aqueous solutions, wettable powders, vapors, dusts, dips and the like, as may be best fitted to the particular utility. The concentration of a compound of the present invention, constituting an effective amount, and the best mode of administration to a pest or its habitat may be easily determined by those skilled in the art of insect control. The disclosure is not meant to limit the action of the compounds to one particular insect species or the mode of effect thereon.

We claim:

1. An insecticidal and miticidal composition comprising an inert adjuvant and an insecticidally or miticidally effective amount of a compound of the formula

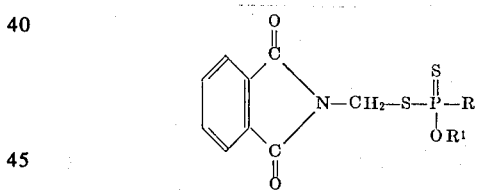

wherein R and R¹ are selected from the group consisting of lower alkyl and chloro lower alkyl.

2. The composition according to claim 1 wherein R is lower alkyl and R¹ is lower alkyl, each having one to four carbon atoms, inclusive.

3. The composition according to claim 1 wherein the compound is O-ethyl-S-(phthalimidomethyl)-ethylphosphonodithioate.

4. The composition according to claim 1 wherein the compound is O-ethyl-S-(phthalimidomethyl)-butylphosphonodithioate.

5. The composition according to claim 1 wherein the compound is O-isobutyl-S-(phthalimidomethyl)-ethylphosphonodithioate.

6. The composition according to claim 1 wherein the compound is O-isopropyl-S-(phthalimidomethyl)-ethylphosphonodithioate.

7. The composition according to claim 1 wherein the compound is O-ethyl-S-(phthalimidomethyl)-chloromethylphosphonodithioate.

8. The method of killing insect and mite pests comprising applying to the insect or mite pest habitat an insecticidally or miticidally effective amount of a compound of the formula

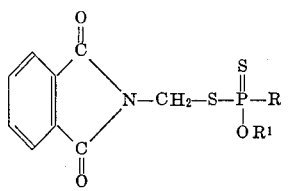

wherein R and R¹ are selected from the group consisting of lower alkyl and chloro lower alkyl.

9. The method according to claim 8 wherein R is lower alkyl and R¹ is lower alkyl, each having one to four carbon atoms, inclusive.

10. The method according to claim 8 wherein the compound is O-ethyl-S-(phthalimidomethyl)-ethylphosphonodithioate.

11. The method according to claim 8 wherein the compound is O-ethyl-S-(phthalimidomethyl)-butylphosphonodithioate.

12. The method according to claim 8 wherein the compound is O-isobutyl-S-(phthalimidomethyl)-ethylphosphonodithioate.

13. The method according to claim 8 wherein the compound is O-isopropyl-S-(phthalimidomethyl)-ethylphosphonodithioate.

14. The method according to claim 8 wherein the compound is O-ethyl-S-(phthalimidomethyl)-chloromethylphosphonodithioate.

* * * * *